Feb. 4, 1941.    T. D. NATHAN    2,230,725
SEALING STRUCTURE
Filed May 28, 1937
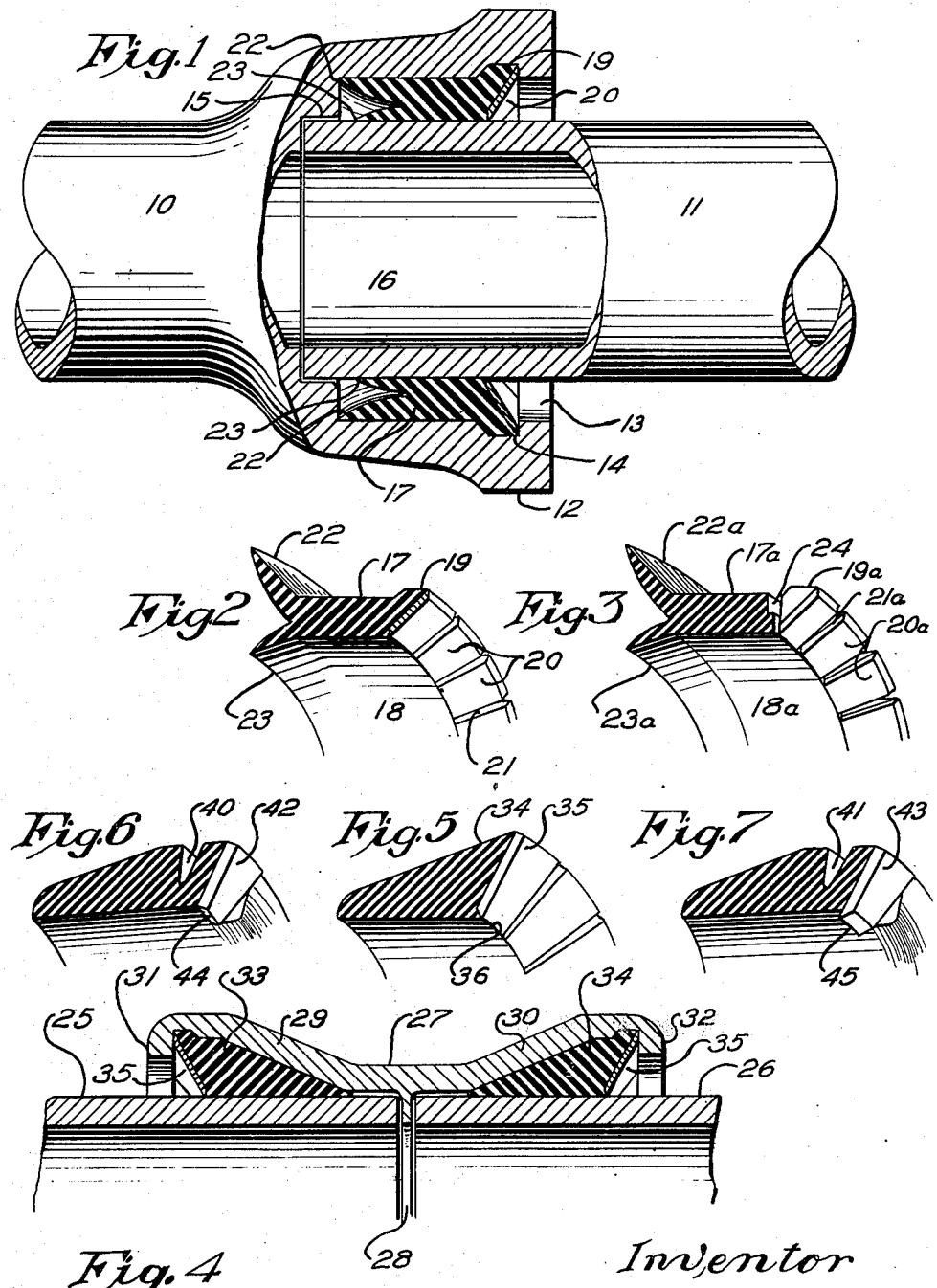
Inventor
Tracy D. Nathan
By Willis F. Avery
Att'y Patented Feb. 4, 1941

2,230,725

UNITED STATES PATENT OFFICE 2,230,725

SEALING STRUCTURE

Tracy D. Nathan, Akron, Ohio, assignor to The B. F. Goodrich Company, New York, N. Y., a corporation of New York Application May 28, 1937, Serial No. 145,285

6 Claims. (Cl. 285—163)

This invention relates to sealing structures for joints between rigid members and is especially useful to seal the joints between fluid conduits, such as bell and spigot pipe members.

The principal objects of the invention are to provide efficient sealing against high pressure, to provide security of the joint against line pull, to provide for automatic alignment of the rigid members, to provide against accidental displacement of the sealing means, and to provide simplicity of construction and assembly.

Other objects are to provide an integral sealing means of simple construction, and capable of being readily assembled in the joint under the most unfavorable conditions, such as in crowded space, under water, or otherwise concealed from the sight of the assembler, and to provide a sealing member which is of simple construction, easily manufactured, and is adapted to be used with many kinds of pipe.

Further objects are to provide locking means for retaining a sealing structure in place, and to eliminate the use of bolts and other clamping devices commonly used to retain such sealing structures.

These and other objects will appear from the following description and the accompanying drawing illustrating embodiments of the invention, it being understood that the invention may be embodied in various forms without departing from the invention.

Of the drawing,

Fig. 1 is a side view of a pair of contiguous pipe elements, shown as partly broken away and partly in section with sealing means comprising one embodiment of the invention in operative position therebetween.

Fig. 2 is a fragmentary perspective view illustrating the sealing means of Fig. 1 when in unrestrained condition, the sealing means being shown partly in section.

Fig. 3 is a similar view showing a modified form of sealing means for use in the structure of Fig. 1.

Fig. 4 is a longitudinal cross sectional view of a pair of adjacent pipe members, a coupling sleeve and a pair of sealing members, showing another embodiment of the invention.

Fig. 5 is a perspective view, partly in section, showing the sealing member of Fig. 4 before it is assembled in the structure illustrated in Fig. 4.

Fig. 6 is a similar view showing a modified form of the sealing member for use in the structure of Fig. 4.

Fig. 7 is a similar view showing a further modification thereof.

Referring to the drawing, and first to Figs. 1 and 2, the numerals 10 and 11 designate two adjacent pipe members which may be of metal or of ceramic or other suitable material. The member 10 is provided with a bell 12 formed on its inner surface to provide the usual caulking counterbore 13 having a lead-lock groove 14 near its mouth. A spigot-aligning counterbore 15 of smaller diameter may also be formed between the counterbore 13 and the bore of the pipe. The spigot 16 of the pipe 11 is preferably smooth on its outer face. These rigid parts may be of standard construction.

A packing or sealing member 17 comprises an annular body 18, of resilient and elastic material such as soft vulcanized rubber or similar material, having a female conical end face and one annular margin thereof terminating in an annular bead 19 of increased diameter.

Attached to the outer end of the packing member at the conical face thereof, preferably by a vulcanized bond thereto or by use of suitable cement, are a series of rigid retaining elements, preferably in the form of metal plates 20, 20 arranged to extend radially in spaced relation at an acute angle to the axis thereof, preferably along the conical face thereof from the bore of the packing member to the outer margin of the bead 19. If desired, the plates or locking elements 20 may be vulcanized to the packing member or actually embedded in the material thereof during vulcanization of the member. The clearance spaces 21 between the retaining elements preferably extend into the packing member to permit the packing member to be expanded or contracted to a sufficient extent to accommodate itself to variations in the dimensions and shape of the rigid members.

When the packing member is inserted in the bell by movement axially thereof, the angular attachment of the metal plates to the resilient packing members and the resilience and elasticity of the members itself, permit them to pass into the bell. Upon being moved into the bell to a position where their outer ends are adjacent the lead-lock groove 14, the elasticity of the packing member causes them to move outwardly so that their outer ends engage the lead-lock groove and act to prevent withdrawal of the packing member from the joint. The inclined position of the retaining elements and their rigidity permit them to act as strut members under the fluid pressure behind the packing member tending to dislodge the packing member, and their innermost margins, which may be sharpened to engage the spigot, tend to grip the spigot when the spigot is in place and prevent withdrawal thereof. As the retaining plates 20, 20 engage the pipe walk by a moving-strut action the lock is very secure. At the same time, the rigidity of the retaining elements and their close spacing prevent flow of the material of the packing member therebetween under such pressure.

Where the spigot member has a rough surface or is circumferentially scored or grooved as is often the case with ceramic and cast iron pipe, such grooves or roughened surfaces assist the retaining elements in obtaining a grip on the spigot, and where preferred such grooves or rough surfaces may be provided for this purpose either in cooperation with sharpened or blunt edges of the retaining elements.

Where the packing member 17 is to be used as the sole means for packing the joint, it is preferably formed so as to seal against both the spigot and the bell under the fluid pressure existing in the line. The preferred manner of accomplishing such sealing is to provide the inner margin of the packing member with a pair of sealing lips 22, 23 integral therewith. The lip 22, which is normally greater in circumference than the body of the sealing member, and is adapted to be forced inwardly by the wall of the bell so as to be pressed into sealing engagement therewith by reason of its resilience, is preferably made longer than the lip 23 so as to engage the bottom of the counterbore of the bell and thereby to space the lip 23 away from said bottom so that said lip 23 will engage the spigot away from its end and will not be jammed between the spigot and the bell when the spigot is placed in position but will be free to seal by lip-action under the fluid pressure. The lip 23 is made smaller in circumference than the spigot so that when the spigot is inserted therein, the lip will be expanded into sealing engagement therewith.

In assembling the joint, the packing member, due to its flexibility and the spacing of the retaining elements thereon, may be reduced in dimensions as by collapsing or forcing one side of the ring radially inward and may then be shoved into the bell. The spigot may then be wet with some convenient lubricating material and forced through the packing ring into place, the relative independence of the retaining elements from each other and the resilience of the packing element permitting any necessary expansion of the ring.

The joint may also be assembled by placing the packing member on the spigot, inserting the spigot in the bell, and then applying force to the packing member by the use of any convenient jack device to move it along the pipe until the retaining elements engage the lead-lock groove in the bell in locking engagement therewith.

When internal fluid pressure is applied from within the line, the increase in pressure will cause the lips 22, 23 to be more strongly pressed against the walls of the bell and spigot respectively so as to seal by lip-sealing action, and any tendency for the packing member to be blown from the joint will be resisted by the strut action of the retaining elements 20 whose outer ends are securely held against outward movement by engagement with the lead-lock groove, and whose inner ends bind against the spigot at an acute angle.

In the modified form of sealing structure illustrated in Fig. 3, hinging of the retaining elements 20ª of the packing member with respect to the body of the packing member is facilitated by forming a circumferential groove 24 in the packing member back of the bead 19ª and by extending the grooves 21ª so as to communicate with the circumferential groove. This permits the packing member to be inserted in bell members in which the flange at the mouth of the bell extends relatively close to the spigot, as hinging of the retaining elements permits their movement toward the axis of the spigot with a minimum exertion of force, especially where the clearance grooves between the retaining elements are of substantial width.

The form shown in Fig. 3 is especially desirable where the packing member is to be inserted without the employment of great force, as where it is to be inserted by hand. In such cases, the dimensions of the body of the packing member, especially as to the thickness of the ring radially thereof may also be made small with relation to the radial thickness of the space between the bell and the spigot so as to permit easy insertion.

Although the invention has been illustrated as applied to metal or ceramic pipe, it will be understood that the device may also be used for sealing the joints of reinforced concrete pipe in which metal rings comprising the bell and spigot surfaces are embedded in concrete and attached to reinforcing elements extending therethrough and the invention is applicable to other conduit constructions as well.

In the embodiment of the invention shown in Fig. 4 the plain ends of two pipes 25, 26 are inserted in a coupling sleeve 27 formed with an internal annular rib 28 for locating the sleeve with respect to the pipes, and the sleeve is formed with conical portions 29, 30 terminating in internal annular shoulders 31, 32, so as to define a cavity between each pipe and the sleeve to receive packing or sealing members 33, 34.

Each packing member is normally of wedge-shape in cross-section as shown in Fig. 5 and of such size as to fill the conical space when forced therein. Each packing member is preferably formed with an end face of conical shape at its thick end and has attached at such end, preferably by vulcanization, a plurality of circumferentially spaced locking elements 35, similar to the elements 20 of Fig. 1. These locking elements are normally inclined toward the axis of the pipe and are adapted to have their outer ends engage the shoulders 31, 32 when the packing members are inserted in the coupling sleeve under compression. Their inner ends are adapted to engage the surface of the pipes when the pipes are axially forced into the coupling, and to be deflected thereby, and these ends are preferably sharpened, as at 36, so as to grip the pipe. Any attempt to withdraw the pipe will cause the locking elements to swing toward the pipe about their outer ends as fulcrums, and thereby to engage the pipe with greater friction by moving-strut action. The tapered portions of the packing members are compressed between the pipe and the couplings so as to seal the joint against internal fluid pressure and any displacement of the material of the rings will tend to force the locking elements outwardly of the coupling and therefore to swing them more strongly into engagement with the pipe surface.

In assembling this embodiment of the invention, the packing member may be distorted and placed in the coupling member in the same manner as described in the description of Fig. 1, and the pipes may then be moved into place therein either concurrently or successively, it is preferred, however, especially where the packing member is to be inserted under great pressure with considerable distortion of the packing member, to place the packing members over the pipes, to insert the pipe ends in the sleeve, and then to force the packing members between the pipes and the sleeve by use of any convenient device such as a pipe jack for applying pressure thereto axially of the pipe. When once forced into place, the retaining elements will engage back of the end flanges on the sleeve and the pressure applying means may then be removed.

The modified forms of packing member illustrated in Figs. 6 and 7 have their outer faces circumferentially grooved as at 40 and 41 to permit hinging of the thicker margins of the packing member which support the retaining elements 42, 43 to more readily permit their passing under the retaining flanges on the sleeve, and also to provide space for flow of the material of the packing member when the member is compressed between the sleeve and the pipes. The retaining elements 42, 43 are preferably made of hardened steel so as to resist buckling and their inner extremities preferably project inwardly beyond the resilient ring member and may be squared, as at 44 to present a sharp corner to the pipe to strongly resist pressure applied to the thin margin of the packing element tending to force the packing from the joint, or may be sharpened as at 45 to present a sharp edge extending toward the end of the pipe and more strongly resisting movement of the pipe, as under line pull, out of the sleeve.

The retaining elements 42, 43 may be closely spaced as illustrated in Fig. 5 or may be widely spaced as in Figs. 6 and 7 to increase the unit pressure on each element and thereby to more securely grip the pipe members. In fact, it is possible, due to the rigidity and hardness of the retaining elements, and this powerful toggle action under either line pull or pressure tending to dislodge the packing, to actually indent the pipe at the points of contact and thereby to mechanically lock the pipe against undesirable movement outwardly of the sleeve.

Variations may be made without departing from the scope of the invention as it is defined in the following claims.

I claim:

1. A one-piece fluid sealing structure for a joint assembly comprising a sealing ring of resilient rubber-like material bodily positionable in the space between radially spaced-apart walls of the assembly, and a circumferentially disposed locking structure adapted to resist ejection of the sealing ring under influence of fluid pressure within the assembly by a moving-strut engagement of the locking structure with said walls, said locking structure being secured to said sealing ring and being resiliently deflectable in circumference by the resilience of the ring so as to be adapted to return after being deflected past a projection on one of said walls upon insertion into the space to engage the projection.

2. A one-piece sealing structure for a pipe joint assembly comprising an endless ring of resilient rubber-like material positionable in the annular space between radially spaced apart pipe members, outwardly turned sharp-edged lip sealing means on the ring engageable with the walls of said space for preventing egress of fluid past the ring, and rigid means integral with the ring and engageable with the walls of the space for retaining it in the space against the force of fluid pressure from within the pipe members tending to eject the sealing structure.

3. A pressure-sealing gasket for the annular joint space between inner and outer pipe members to seal the space while the gasket is restrained against movement out of the joint space and the rear end of the gasket is exposed to fluid-pressure from within the pipe members, said gasket being of resilient rubber-like material and having inner and outer lips at its rear end adapted to engage the pipe members, the outer lip projecting rearward and radially outward and the inner lip projecting rearward and radially inward from the body of the gasket and both lips tapering to fine edges adapted to remain against the pipe members upon flexure of the lips against the members to bar the pressure fluid and utilize the same to urge the gasket forwardly to pack the joint space, and a plurality of plate elements secured to the forward end of the gasket each radially greater in dimension than the joint space and adapted to engage the pipe members in moving-strut fashion to serve as an abutment for the gasket to prevent ejection thereof under the force of the pressure fluid.

4. A pressure-sealing one-piece gasket bodily insertable in the annular joint space between inner and outer pipe members to seal the space while the gasket is restrained against movement out of the joint space and the rear end of the gasket is exposed to fluid pressure from within the pipe members, said gasket comprising a body of resilient rubber-like material having lip means integral therewith adapted to engage the pipe members to prevent leakage of the pressure fluid past the gasket so that by the fluid pressure the gasket will be urged forward in the joint space to pack the same, and means comprising obliquely disposed elements integral with said gasket for engaging the pipe members in a manner to resist axial separation of the members.

5. A pressure-sealing gasket for the annular joint space between inner and outer pipe members, said gasket comprising a body of resilient rubber-like material adapted to be bodily urged forwardly in the space under the force of fluid pressure from within the members to pack the space, said body comprising a circumferentially-disposed series of locking portions projecting radially outward from said body at the forward end thereof and adapted to engage behind a shoulder on the outer of said members to resist ejection of the gasket under said force, said locking portions being adapted to be deflected resiliently past said shoulder during assembly of the joint and to be urged into the locking position behind said shoulder by the resilience of the gasket material.

6. Means for sealing the annular space between inner and outer radially spaced-apart members, said means comprising an annular gasket of resilient rubber-like material adapted to be bodily advanced axially in said space relative to both the inner and outer members under the force of fluid pressure from within the members to pack said space, said gasket element having a metallic element in vulcanized adhesion with the gasket at the front thereof in such disposition as to contact both said inner and outer members and to be pressed tightly against said members under the advance of said gasket element.

TRACY D. NATHAN.